United States Patent
Meyer et al.

(10) Patent No.: US 10,449,965 B2
(45) Date of Patent: Oct. 22, 2019

(54) DRIVER ASSISTANCE DEVICE FOR A MOTOR VEHICLE, AND METHOD FOR OPERATING A MOTOR VEHICLE

(71) Applicant: AUDI AG, Ingolstadt (DE)

(72) Inventors: Herbert Meyer, Regensburg (DE); Andreas Schiergl, Schierling (DE); Clemens Burow, München (DE)

(73) Assignee: AUDI AG, Ingolstadt (DE)

( * ) Notice: Subject to any disclaimer, the term of this patent is extended or adjusted under 35 U.S.C. 154(b) by 115 days.

(21) Appl. No.: 15/759,640

(22) PCT Filed: Nov. 8, 2016

(86) PCT No.: PCT/EP2016/076982
§ 371 (c)(1),
(2) Date: Mar. 13, 2018

(87) PCT Pub. No.: WO2017/081006
PCT Pub. Date: May 18, 2017

(65) Prior Publication Data
US 2018/0257650 A1    Sep. 13, 2018

(30) Foreign Application Priority Data
Nov. 11, 2015  (DE) .......................... 10 2015 222 262

(51) Int. Cl.
*B60W 30/182*   (2012.01)
*B60W 50/08*    (2012.01)
(Continued)

(52) U.S. Cl.
CPC ...... *B60W 30/182* (2013.01); *B60W 30/1884* (2013.01); *B60W 50/082* (2013.01);
(Continued)

(58) Field of Classification Search
None
See application file for complete search history.

(56) References Cited

U.S. PATENT DOCUMENTS

| | | | |
|---|---|---|---|
| 8,414,450 B2 * | 4/2013 | Ueno ..................... | B60K 6/365 180/65.265 |
| 8,818,600 B2 * | 8/2014 | Reed ..................... | B60W 10/02 701/22 |

(Continued)

FOREIGN PATENT DOCUMENTS

| | | |
|---|---|---|
| DE | 19951119 A1 | 4/2001 |
| DE | 102005019790 A1 | 12/2005 |

(Continued)

OTHER PUBLICATIONS

Office Action issued dated Jun. 18, 2019, in corresponding German Application No. 10 2015 222 262.4 including partial machine-generated English language translation; 7 pages.

(Continued)

*Primary Examiner* — Dirk Wright
(74) *Attorney, Agent, or Firm* — Maier & Maier, PLLC

(57) ABSTRACT

A driver assistance device for a motor vehicle with a drive assembly, which can be connected to a drivetrain via a clutch that can be activated by an actuator. The clutch being a component of an electronically controlled clutch system, in which a clutch pedal sensor detects an actuation of a clutch pedal on the driver's side and in which an analysis unit determines, in a first control mode on the basis of the detected clutch pedal actuation, a clutch torque and actuates the clutch with a corresponding clutch signal. For an adjustment of the clutch response on the driver's side, the analysis unit is associated with an input unit, for the actuation of which, on the driver's side, it is possible to shift between the first control mode and at least one second control mode.

7 Claims, 2 Drawing Sheets

(51) Int. Cl.
  *B60W 30/188* (2012.01)
  *F16D 48/08* (2006.01)
  *B60W 50/00* (2006.01)

(52) U.S. Cl.
  CPC ..... *F16D 48/08* (2013.01); *B60W 2050/0063* (2013.01); *B60W 2510/0291* (2013.01); *B60W 2510/0638* (2013.01); *B60W 2540/04* (2013.01); *B60W 2540/10* (2013.01); *B60W 2540/14* (2013.01); *B60W 2710/021* (2013.01); *B60W 2710/027* (2013.01); *F16D 2500/10412* (2013.01); *F16D 2500/3067* (2013.01); *F16D 2500/30404* (2013.01); *F16D 2500/3144* (2013.01); *F16D 2500/31413* (2013.01); *F16D 2500/5048* (2013.01); *F16D 2500/50858* (2013.01)

(56) References Cited

U.S. PATENT DOCUMENTS

| | | | | |
|---|---|---|---|---|
| 9,333,972 | B2* | 5/2016 | Neumann | B60W 30/18072 |
| 9,434,274 | B2* | 9/2016 | Kagerer | B60L 15/10 |
| 9,533,669 | B2* | 1/2017 | Kono | B60W 10/02 |
| 9,598,083 | B2* | 3/2017 | Suzuki | F02N 11/0833 |
| 9,988,051 | B2* | 6/2018 | Yoon | B60W 30/18072 |
| 2018/0065620 | A1* | 3/2018 | Eo | B60W 20/15 |
| 2018/0162397 | A1* | 6/2018 | Eo | B60W 20/15 |

FOREIGN PATENT DOCUMENTS

| | | |
|---|---|---|
| DE | 102006026975 A1 | 1/2007 |
| DE | 102006054021 A1 | 5/2008 |
| DE | 102010034422 A1 | 3/2011 |
| DE | 102011075199 A1 | 11/2012 |
| DE | 102012202442 A1 | 8/2013 |
| DE | 102013218786 A1 | 3/2015 |
| EP | 1914435 A1 | 4/2008 |
| FR | 3010473 A1 | 3/2015 |

OTHER PUBLICATIONS

Examination Report dated Jul. 25, 2016 of corresponding German application No. 102015222262.4; 6 pgs.

International Search Report dated Feb. 6, 2017 or corresponding International application No. PCT/EP2016/076982; 14 pgs.

Translation of International Preliminary Report on Patentability dated May 24, 2018 in corresponding International application No. PCT/EP2016/076982; 8 pgs.

* cited by examiner

//<br>
DRIVER ASSISTANCE DEVICE FOR A MOTOR VEHICLE, AND METHOD FOR OPERATING A MOTOR VEHICLE

FIELD

The invention relates to a driver assistance device for a motor vehicle and a method for operating such a motor vehicle.

BACKGROUND

A vehicle with a manual transmission is usually equipped with a mechanically or hydraulically actuated starting clutch. Through actuation of the clutch, the drivetrain between a drive assembly of an internal combustion engine, for example, and a vehicle transmission can be temporarily disconnected in order to shift a gear in the vehicle transmission, for example. For a mechanically or hydraulically actuated clutch, the transmission response is fixed unchangeably by the foot of the driver until torque has built up in the drivetrain.

As alternative to such a mechanically or hydraulically actuated starting clutch, an electronically controlled clutch system is known, in which a clutch pedal sensor detects an actuation of a clutch pedal on the driver's side and in which an analysis unit determines a clutch torque correlating therewith on the basis of the detected clutch pedal actuation and actuates a clutch actuator of the clutch by way of a corresponding clutch signal.

Such a generic electronically controlled clutch system is known from DE 10 2013 218 786 A1. In this case, the analysis unit has a gliding detection unit for actuating the clutch actuator, by means of which, on the basis of current vehicle operation parameters, a gliding driving state that is suitable for a gliding operation on the side of the vehicle can be detected. The presence of such a gliding driving state is signaled to the driver. Once a release signal or an acceptance signal of the driver is present, the analysis unit can implement the gliding operation automatically. In this case, the analysis unit of the electronically controlled clutch system autonomously opens or disengages the clutch in order to release a torque-transmitting connection between the drive assembly and the transmission or the vehicle wheels.

SUMMARY

The object of the invention may provide a driver assistance device for a motor vehicle, with which the driver can vary the vehicle behavior in driving operation in a simple way.

The clutch behavior or the transmission response of the clutch can be adjusted on the driver's side. For this purpose, the analysis unit of the electronically controlled clutch system is associated with an actuated input unit on the driver's side. When the input unit is not actuated, the signal processing (that is, the determination of the clutch torque on the basis of the detected clutch actuation) occurs in the analysis unit in a first control mode. Through actuation of the input unit, the signal processing in the analysis unit no longer occurs in the first control mode, but rather in a second control mode differing from it, as a result of which a different clutch response of the clutch is adjusted. Preferably, in the first control mode, the clutch torque determination can be made on the basis of a first characteristic curve (or an algorithm) deposited in the analysis unit, by means of which, from the detected clutch pedal actuation, the clutch torque correlating with it is determined. In a corresponding way, in the second control mode, the clutch torque determination can be made on the basis of a second characteristic curve (or algorithm) deposited in the analysis unit.

The clutch actuation is detected via the clutch pedal sensor of the electronically controlled clutch system. By means of the clutch pedal sensor, it is possible to detect, if need be, an absolute pedal position, a pedal path, and/or a pedal gradient, on which the clutch torque determination in the analysis unit is based.

In a technical implementation, the first control mode in the analysis unit of the electronically controlled clutch system is preset at the factory. The first control mode can be designed in such a way that a clutch response that is comfortable for the driver ensues and provides a good starting ability of the clutch without any jerking. In contrast to this, the driver can select, instead of the first control mode, the second control mode, which, by way of example, realizes a transmission response/clutch response that corresponds to a mechanically or hydraulically working clutch for which the torque buildup in the drivetrain (during starting operation) is proportional at all times to the clutch pedal position. In this case, therefore, the clutch behavior is designed in such a way that, in comparison to the first control mode, an accelerated torque buildup is made possible in the powertrain with corresponding greater response sensitivity as well as with jerking.

The input unit for the selection of the first or second control mode on the driver's side can be arranged in a display system in the passenger compartment of the vehicle, for example, in a man-machine interface (MMI).

In a further development of the invention, it is possible additionally to provide a third control mode, which can be selected by the driver by means of the input unit.

Preferably, the third control mode is designed in such a way that, when the third control mode is engaged by the driver, auxiliary functions of the driver assistance device can be activated or deactivated specifically. Such auxiliary functions are actively engaged in a factory setting. In a technical implementation, with an engaged third control mode, the driver can specifically select or deselect individual auxiliary functions in a selection menu. During the subsequent clutch operation, the analysis unit of the driver assistance device responds to the menu settings configured by the driver.

By way of example, the analysis unit can have, as an auxiliary function, a gliding detection unit. By means of the gliding detection unit, it is possible, on the basis of current vehicle operation parameters, to detect a gliding driving state that is suitable for a gliding operation on the vehicle's side. When such a gliding driving state is present, the analysis unit generates a corresponding gliding signal for the driver. When there is a release or acceptance signal on the driver's side, the analysis unit can automatically implement the gliding operation, that is, disengage the clutch automatically.

The analysis unit can have, as an additional auxiliary function, an overheating protection, by means of which the current clutch temperature can be determined. Once the current clutch temperature exceeds a threshold value, the analysis unit actuates the clutch (clutch actuator) automatically in order to disengage it. The overheating protection can be deactivated by the driver in the third control mode. In this case, it is possible, if need be, for the overheating protection to be actuated once more in an emergency situation in spite of an overheated clutch.

Alternatively and/or additionally to the above auxiliary functions, a starting monitor function can be integrated into the analysis unit in order to protect the vehicle against an unintended stalling of the engine. By means of the starting monitor function, it is possible to detect, on the basis of the current engine speed and a current accelerator pedal actuation, an operating state that leads to a stalling of the engine. When such an operating state is present, the analysis unit can disengage the clutch automatically in order to prevent a stalling of the engine during starting operation, for example.

The advantageous embodiments and/or further developments of the invention discussed above and/or presented in the dependent claims—apart, for example, from cases of clear dependences—or incompatible alternatives—can be employed individually, but also in any combination with one another.

The invention and its advantageous embodiments and further developments as well as the advantages thereof will be discussed in detail below on the basis of drawings.

BRIEF DESCRIPTION OF THE DRAWING

Shown are.

DETAILED DESCRIPTION OF THE DRAWING

Figure 1:
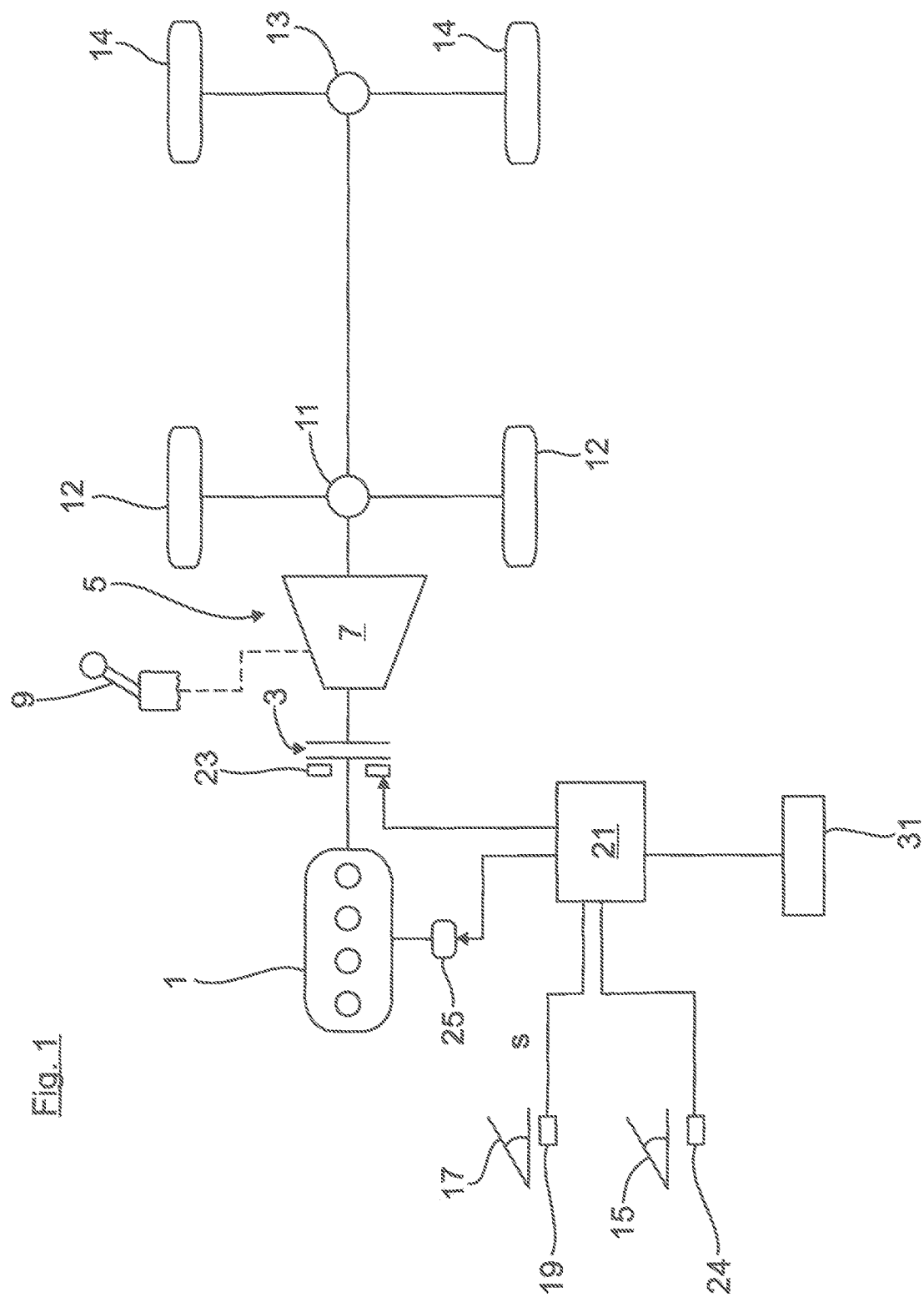
FIG. 1 in a highly schematic flowchart, the drivetrain of a motor vehicle with an associated driver assistance device.
Figure 2:
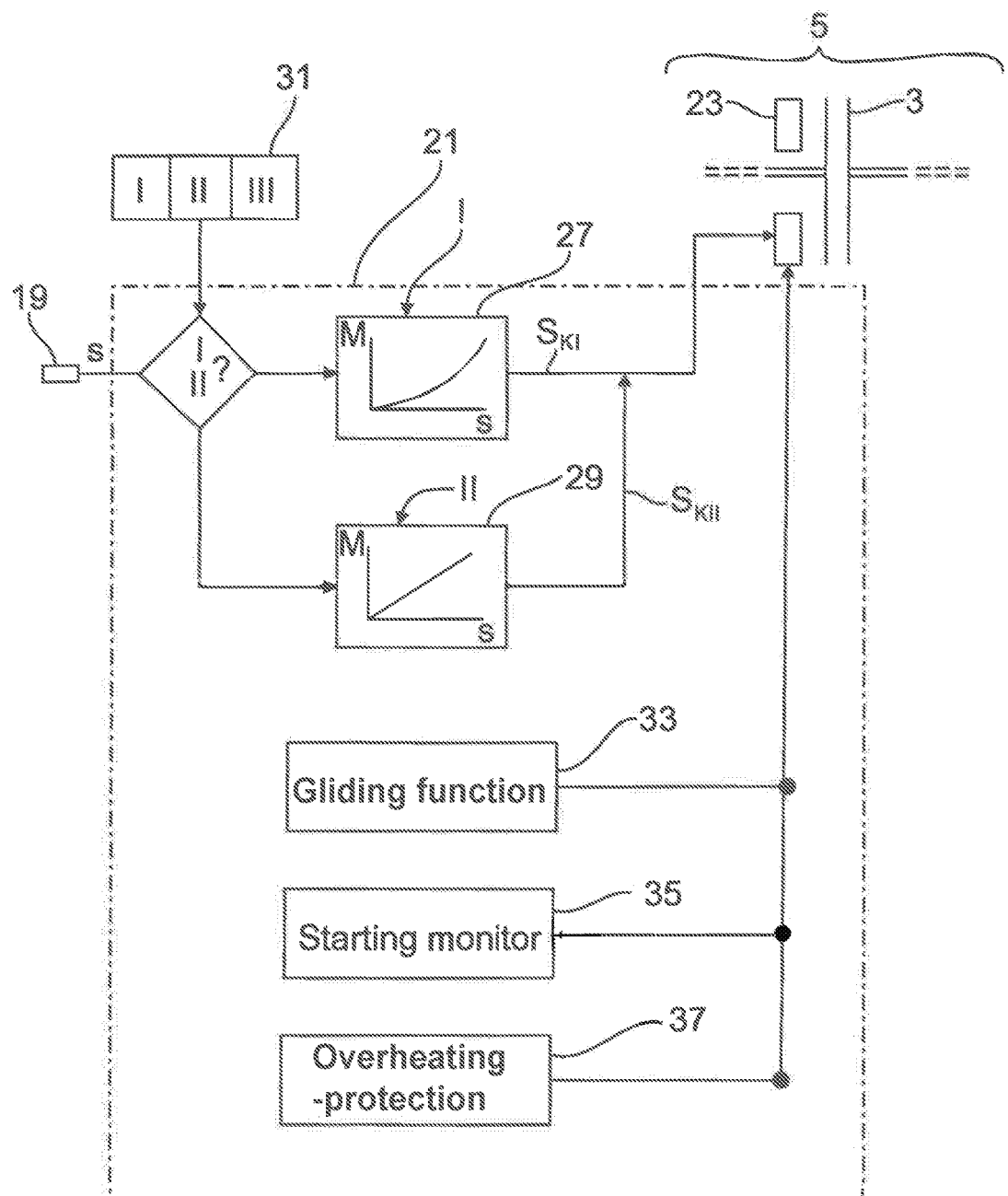
FIG. 2 in another flowchart, the basic construction of an analysis unit of the driver assistance device.

FIG. 1 and FIG. 2 have been prepared in view of a simple understanding of the invention. For this reason, the figures are merely highly simplified illustrations, which do not depict a construction of the driver assistance device that is true to reality. Thus, in FIG. 1, a motor vehicle is sketched, the internal combustion engine 1 of which can be coupled to a drivetrain 5 via a separating clutch 3. Arranged in the drivetrain 5 of the motor vehicle is a manual transmission 7, which, can be actuated manually by means of a manual shift 9. At the output end, the transmission 7 is connected to a front-axle differential 11, by means of which the drive torque is transmitted to the front wheels 12. The front-axle differential 11 is connected, in addition, via a Cardan shaft, to a rear-axle differential 13, by way of which the drive torque can be transmitted to the rear wheels 14 of the vehicle. The internal combustion engine 1 as well as the separating clutch 3 can be actuated by the driver via an accelerator pedal 15 and a clutch pedal 17.

As can be seen further from FIG. 1, the separating clutch 3 is a component of an electronically controlled clutch system, in which, by means of a clutch pedal sensor 19, an actuation s of the clutch pedal 17 on the driver's side is detected. The clutch system has, in addition, an analysis unit 21, which determines, on the basis of the detected clutch pedal actuation s (that is, pedal path, pedal position, pedal gradient), a clutch torque M and, by means of a corresponding clutch signal $S_{KI}$, $S_{KII}$, actuates a clutch actuator 23 of the separating clutch 3.

For determination of the clutch torque M, a first characteristic curve 27 and a second characteristic curve 29 are deposited in the analysis unit 21. From the detected clutch pedal actuation s, the clutch torque M correlating with it or the corresponding clutch signals $S_{K1}$ and $S_{K2}$ are determined by means of said characteristic curves.

Analogously to the clutch pedal 17, the accelerator pedal 15 also has an associated accelerator pedal sensor 24, with which an actuation of the accelerator pedal 15 on the driver's side can be detected. The analysis unit 21 determines, on the basis of the detected accelerator pedal actuation, a prespecified torque with which an engine control instrument 25 of the internal combustion engine 1 can be actuated for producing an engine torque.

In addition, the analysis unit 21 is in signal connection with an input unit 31, by means of which the driver can vary the clutch response of the separating clutch 3. When there is an actuation of the input unit 31 on the driver's side, the driver can select between the first characteristic curve 27 and the second characteristic curve 29. When the first characteristic curve 27 is selected, the analysis unit 21 works in a first control mode I, which is preset at the factory by way of example. In the first control mode I, the clutch response is comfortably designed; that is, a good starting ability without jerking is provided, for which, during starting operation, a delayed (or gentler) torque buildup takes place in the drivetrain 5. Provided that the driver has selected the control mode II with its associated second characteristic curve 29, there results, in contrast, a clutch response for which the separating clutch 3 responds with higher response sensitivity as well as with jerking, as a result of which an accelerated torque buildup ensues in the powertrain 5.

As can be seen from the figures, it is possible additionally, by means of the input unit 31, for the driver also to engage a third control mode III. In the third control mode III engaged by the driver, it is possible for the following described auxiliary functions 33, 35, 37 to be activated or deactivated specifically by the driver. The auxiliary functions 33, 35, 37 are provided in the driver assistance system in order to assist the driver in driving operation.

As can be seen from FIG. 2, the analysis unit 21 can have, as an auxiliary function, a gliding detection 33, by means of which, on the basis of current vehicle operation parameters, a gliding driving state that is suitable for a gliding operation on the part of the vehicle can be determined. When such a gliding driving state exists, the analysis unit 21 generates a corresponding recommendation for the driver. When a following release on the driver's side occurs, the analysis unit 21 can activate the gliding operation automatically, that is, disengage the separating clutch 3 automatically.

Alternatively and/or additionally, it is possible to integrate in the analysis unit 21, as another auxiliary function, an overheating protection function 35, by which the current clutch temperature in the separating clutch 3 can be determined. Once the current clutch temperature exceeds a threshold value, the analysis unit 21 controls the separating clutch 3 automatically in order to disengage it.

As another auxiliary function, it is possible to integrate in the analysis unit 21 a starting monitor function 35, with which the vehicle is protected against an unintended stalling of the engine. By means of the starting monitor function 35, it is possible, on the basis of the current engine speed and a current accelerator pedal actuation, to detect an operating state that leads to a stalling of the engine. When such an operating state is detected, the analysis unit 21 disengages the separating clutch 3 automatically in order to prevent a stalling of the engine.

The invention claimed is:
1. A driver assistance device for a motor vehicle, comprising:
a drive assembly, which can be connected to a drivetrain via a clutch that can be activated by an actuator, said clutch being a component of an electronically controlled clutch system, in which a clutch pedal sensor detects an actuation of a clutch pedal on the side of the driver and in which an analysis unit determines, in a first control mode on the basis of the detected clutch pedal actuation, a clutch torque and actuates a clutch actuator of the clutch with a corresponding clutch signal, wherein, for an adjustment of the clutch response on the driver's side, the analysis unit is associated with an actuated input unit on the driver's side and in that, when the input unit is actuated on the driver's side, it is possible to shift between the first control mode and at least one second control mode.

2. The driver assistance device according to claim 1, wherein, in the first/second control mode, the clutch torque determination is made on the basis of a first/second characteristic curve deposited in the analysis unit, by which, from the detected clutch pedal actuation, the clutch torque correlated therewith can be determined.

3. The driver assistance device according to claim 1, wherein the first control mode in the analysis unit is preset at the factory, and/or in the second control mode, a clutch response is realized that corresponds to the clutch response of a mechanically or hydraulically actuated clutch for which, in starting operation, the torque buildup in the drivetrain is proportional at all times to the clutch pedal position.

4. The driver assistance device according to claim 1, wherein auxiliary functions are provided by the driver assistance device, which assist the driver during driving operation, and by the input unit, it is possible to engage a third control mode, and in the third control mode engaged by the driver, the auxiliary functional units provided by the driver assistance device can be activated or deactivated specifically by the driver.

5. The driver assistance device according to claim 4, wherein, as an auxiliary function, a gliding detection unit is provided, by means of which, on the basis of current vehicle operation parameters, a gliding driving state that is suitable for a gliding operation on the side of the motor vehicle can be detected, and when a gliding driving state is present, the analysis unit signals the gliding driving state to the driver and implements automatically a release of the gliding operation on the driver's side.

6. The driver assistance device according to claim 4, wherein, as an auxiliary function, an overheating protection unit is provided, by which a current clutch temperature can be determined and the clutch is automatically disengaged once the current clutch temperature exceeds a threshold value.

7. The driver assistance device according to claim 4, wherein, as an auxiliary function, a starting monitor unit for protection against a stalling of the engine is provided, by which, on the basis of the current engine speed and a current accelerator pedal actuation, an operating state that leads to a stalling of the engine can be recognized, and when such an operating state is recognized, the analysis unit disengages the clutch automatically in order to prevent a stalling of the engine.

* * * * *